March 17, 1931. J. A. C. KING 1,796,376
APPARATUS FOR TESTING RAILROAD SIGNAL SYSTEMS
Filed May 22, 1930
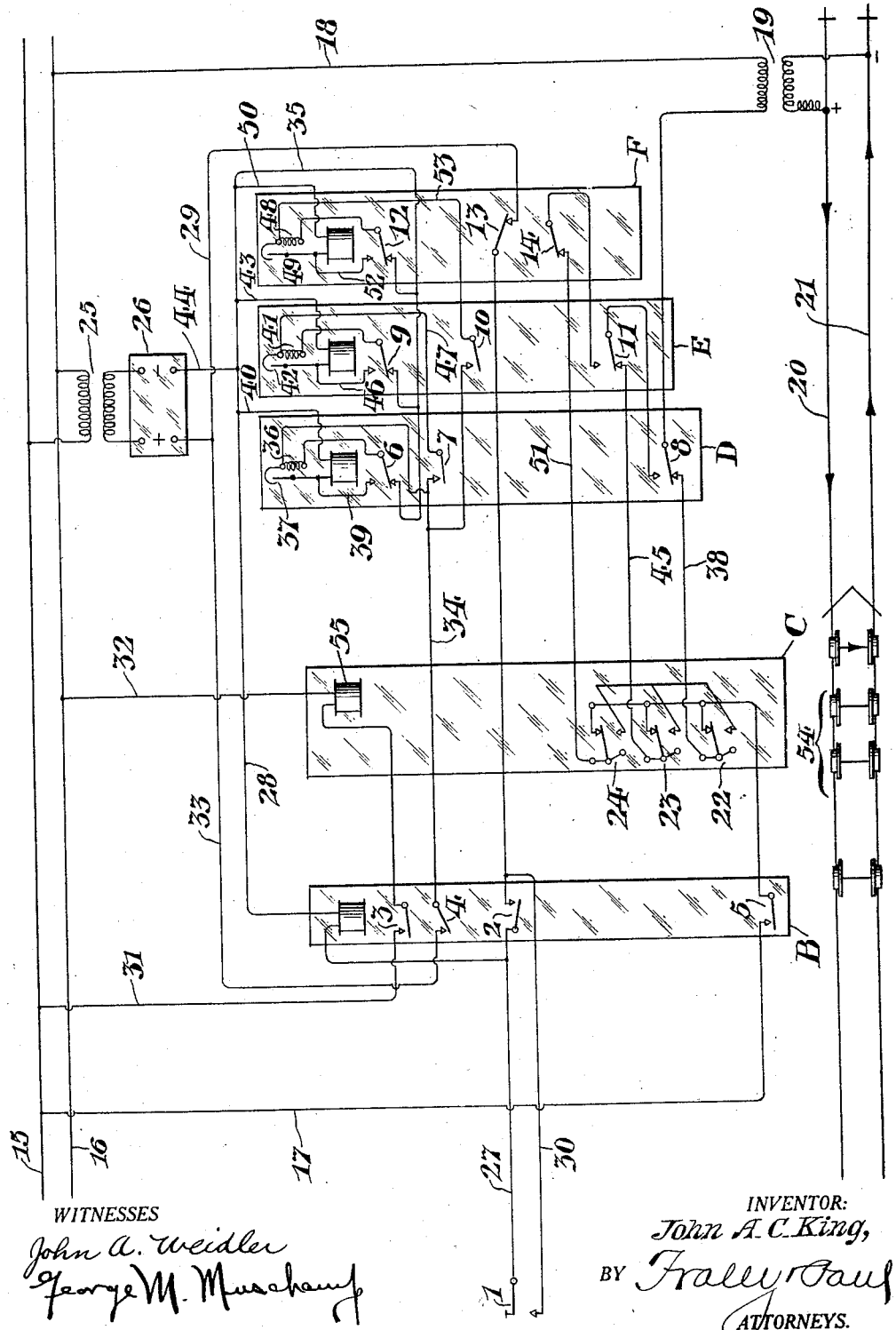
WITNESSES
John A. Weidler
George M. Muschamp
INVENTOR:
John A. C. King,
BY Frailey Paul
ATTORNEYS.

Patented Mar. 17, 1931

1,796,376

UNITED STATES PATENT OFFICE

JOHN A. C. KING, OF LANSDOWNE, PENNSYLVANIA

APPARATUS FOR TESTING RAILROAD SIGNAL SYSTEMS

Application filed May 22, 1930. Serial No. 454,613.

This invention relates to an apparatus for testing railroad signal systems, and is particularly adapted for use with the so-called continuous inductive type of locomotive cab signals in which instrumentalities on a locomotive respond to currents in a wayside circuit to provide cab signal indications for the engineer. Such systems commonly include means for automatically sounding a warning whistle after a more restrictive indication is given, as well as means for suppressing the sounding of the warning whistle, and they may also include an automatic train control by which train brakes are automatically applied when the more restrictive indication is given unless steps are taken to forestall the brake application. My invention, while susceptible of a variety of applications is particularly suited for use with such systems.

Heretofore is has been the practice to test locomotive equipment of cab signal systems of this type by operating an indication switch of a testing apparatus, first to give one cab signal and then to give another. This has been done by holding the switch for several seconds in each position, and successively changing the position of the indication switch to give signals representing "clear", "approach restricting", "approach", etc. In testing locomotive equipment in this manner is has been customary to employ the services of several men and to delay the departure of a locomotive, the tests being conducted with the locomotive standing idle, and the apparatus for producing cab signal indications and sounding the warning whistle being controlled by successive manual operations.

The principal object of the present invention is to expedite the testing of the locomotive equipment by providing an apparatus which when set in operation will conduct all of the necessary tests automatically and in a prescribed succession, and which, if desired, will enable the tests to be conducted while the locomotive is running at a high rate of speed. Furthermore, my invention contemplates, under certain conditions, the carrying out of a complete set of tests by the engineer alone without the aid of other persons. For this purpose the operating switch which controls the testing circuit may be placed within reach of the engineer so that it may be actuated from the cab.

Further objects and advantages of the invention will be apparent from the description which follows and which has reference to the accompanying drawing diagrammatically illustrating in a single figure one embodiment or example of the invention.

The conductors indicated at 15 and 16 in the drawing represent a source of alternating current supply which through branch conductors 17 and 18 leads to a multiple-unit code transmitter C. This circuit includes the primary coil of a transformer 19 by means of which the coded current is induced in a track circuit 20, 21, and from thence transmitted to the receiving equipment of a locomotive diagrammatically indicated at 54.

The coding device C comprises a magnet 55 and a set of code transmitting units 22, 23 and 24 operated thereby. The units 22, 23 and 24 are adapted to be rendered effective in alternate succession to transmit current at, say, 180 interruptions per minute, 120 interruptions per minute and 80 interruptions per minute, respectively, to the track circuit 20, 21. The coding device C used for the testing apparatus of this invention may be similar to the code transmitters now generally used for producing cab signal indications by signals differing as to the number of interruptions per minute, and the code signals produced by the units 22, 23 and 24 correspond with the signals normally transmitted in the operation of the system to give indications in a locomotive cab respectively designated as, say, "clear", "approach restricting" and "approach".

For setting the code transmitter C into operation a stick relay B is provided, the relay B including four contacts 2, 3, 4 and 5 which are shown in their normal open position and which are adapted to be closed when the relay is energized. In addition to the stick relay B there are shown three thermal relays D, E and F, of a type commonly used in railroad signalling apparatus, these relays including three sets of contacts designated by the numerals 6 to 14, each set being shown in normal position, and the position of each contact being changed when the relay of which it is a part is energized. From the description hereinafter it will be apparent that the means for operating the coding device C to produce the code signals in proper sequence and with the desired time interval between each signal are fully automatic and not dependent upon conditions in the neighboring blocks of the track circuit, but on the contrary are wholly independent, apart from their function as a part of the test circuit, of the system to be tested.

For setting the test circuit into operation a push-button switch 1 is provided. This switch 1 may be located at any convenient point along the roadway which may be designated as the testing station. It may be found convenient to place the switch in a position accessible from the cab of an engine so that the engineer may conduct the test by himself; and it may be found convenient to substitute a relay for the switch or to provide a remote control for setting the testing device in operation.

Whatever form the switch 1 or equivalent electrical apparatus substituted therefor may take, it is adapted upon a single actuation to set in motion means for operating and for alternately rendering effective in a prescribed succession the units 22, 23 and 24, of the coding device C, and for thereafter returning the apparatus of the circuits to be described to normal position.

The switch 1 is located in a circuit including the secondary coil of a transformer 25 receiving current from main conductors 15 and 16, a rectifier 26 and the magnet of stick relay B. When the switch 1 is closed a circuit is completed through switch 1, conductor 27, the magnet of relay B, conductors 28 and 44, transformer 25, conductor 29, a contact 13 and conductor 30, thus energizing the magnet of stick relay B and causing contacts 2, 3, 4, and 5, to close.

The closing of contact 2 completes the above described energizing circuit for the relay B through contact 2 and permits the relay to remain energized when the push button is released. The closing of contact 3 energizes the magnet 55 of the coding device C through conductors 31 and 32. The closing of contact 4 allows current to pass from one side of the secondary coil of the transformer 25 through conductor 33, contact 4, conductor 34 to the magnet of thermal relay D and thence through contact 6, and conductors 35 and 44 to the other side of the coil of transformer 25. The thermal relay D does not operate immediately, its action being delayed for several seconds by means of a heat control element 36 which after the lapse of a predetermined interval completes a contact at 37 to energize the relay D. The closing of contact 5 meanwhile permits current to pass through conductor 17, contact 5, unit 22 of the coding device C, conductor 38, contact 8, the primary coil of transformer 19, and conductor 18, thus rendering effective unit 22 of the coding device C and causing current with 180 interruptions per minute to be induced in the track circuit 20, 21 from whence it is transmitted to the locomotive equipment giving a "clear" cab signal indication.

Shortly thereafter the heat control element 36 of thermal relay D closes contact 37 to energize the relay, at the same time by-passing the heat control element 36 and causing a reversal of the normal position of contacts 6, 7 and 8. The closing of contact 6 merely serves to keep the relay D energized through a circuit including conductor 39, contact 6, conductor 34, contact 4, conductor 33, transformer 25 and conductors 44 and 40. The closing of contact 7 permits current to pass through conductor 33, contact 4, conductor 34, and contact 7 to the heat control element 41 of thermal relay E, and thence after the heat control element has closed a contact at 42, through the thermal relay E, and conductors 43 and 44 to the other side of transformer 25. The change in position of contact 8 renders the unit 22 of the coding device ineffective and renders the unit 23 effective. Current is permitted to pass through conductor 17, contact 5, unit 23, conductor 45, contact 11, contact 8 to transformer 19 and thence through conductor 18 to the source of current supply. Accordingly, unit 23 of the coding device C being effective, current with 120 interruptions per minute is caused to be induced in the track circuit 20, 21 from whence it is transmitted into the locomotive equipment giving an "approach restricting" cab signal indication and sounding the warning whistle or initiating a train stop or both according to the nature of the system being tested.

Shortly thereafter, the thermal relay E operates to reverse the position of contacts 9, 10 and 11. The change in position of contact merely serves to maintain the magnet of relay E energized through a circuit including conductor 46, contact 9, conductor 47, contact 7, conductor 34, contact 4, conductor 33, transformer 25, and conductors 44 and 43. The closing of contact 10 permits current to pass through conductor 33, contact 4, conductor 34, contact 10 to the heat control element 48 of thermal relay F and thence after the heat control element has closed a contact at 49, through the magnet of thermal relay F conductors 50 and 44 to the other side of transformer 25. The change in position of contact 11 renders the unit 23 of the coding device C ineffective and renders the unit 24 effective. Current is permitted to pass through conductor 17, contact 5, unit 24, conductor 51, contact 14, contact 11, and contact 8 to the transformer 19 and thence through conductor 18 to the source of current supply. Accordingly, unit 24 of the coding device C being effective, current with 80 interruptions per minute is caused to be induced in the track circuit 20, 21 from whence it is transmitted to the locomotive equipment giving an "approach" cab signal indication and sounding a warning whistle or initiating a train stop or both according to the nature of the system being tested.

Shortly thereafter, the thermal relay F operates to reverse the position of contacts 12, 13 and 14. The change in position of contact 12 will serve to maintain the magnet of thermal relay F energized through a circuit including conductor 52, contact 12, conductor 53, contact 10, conductor 34, contact 4, conductor 33, transformer 25 and conductors 44 and 50. The opening of contact 14 will render the coding device C ineffective. The opening of contact 13 will break the circuit previously mentioned by which stick relay B is energized. This in turn will return contacts 2, 3, 4 and 5 to their normal open position. The opening of contact 3 of the stick relay B serves to de-energize the magnet 55 of the code transmitter C. The opening of contact 4 serves to de-energize the magnets of thermal relays D, E and F, which in turn causes the remainder of the contacts to all return to their normal position and prepares the testing device for the next operation. When contact 5 of stick relay B is returned to open position no current from the apparatus can pass through transformer 19, and accordingly there will be an absence of current in the track circuit 20, 21. The condition in which there is an absence of current in the track circuit may be made to cause a "caution" or "slow speed" or other cab signal indication.

It will be apparent, therefore, that the above described testing apparatus may be used for simulating four different code signals to which a locomotive equipment is responsive. The signals being given in a prescribed succession and with a definite interval between each signal, if there should be a defect in the locomotive equipment, it will be easily detected by the engineer as the test is being carried out..

To a person skilled in this art it will be obvious that the testing apparatus of this invention may be applied to various train control and signal systems and that considerable departure may be made from the form of the apparatus herein described and illustrated without departing from the spirit of the invention as defined in the appended claims.

For example, while I have shown a hand operated switch for setting the testing apparatus in operation and thermal relays for retarding the making and breaking of certain contacts, it is within the contemplated scope of this invention to substitute other electrical apparatus having equivalent functions for the devices herein described. Obviously, any device for making or breaking a circuit may perform the function of the hand operated switch.

Having thus described my invention, I claim:

1. An apparatus for testing a railroad signal system comprising a track circuit, a test circuit associated therewith, said test circuit including a plurality of code transmitting devices for inducing code signals in said track circuit, a switch, and means set in operation by a single movement of said switch for automatically rendering said code transmitting devices effective in a prescribed succession.

2. An apparatus for testing a railroad signal system comprising a track circuit, a test circuit associated therewith, said test circuit including a multiple-unit code transmitting device interrupting said current to produce different code signals, means associated with each said unit for inducing said code signals in said track circuit, a switch, and means set in operation by a single movement of said switch for automatically rendering the units of said code transmitting device effective in a prescribed succession.

3. An apparatus for testing a railroad signal system comprising a track circuit, a test circuit associated therewith, said test circuit including a plurality of code transmitting devices for inducing different code signals in said track circuit, a switch, and means including a number of relays set in operation by a single movement of said switch in a prescribed succession with a predetermined time interval between the operation of each relay, said means serving to render said code transmitting devices effective in a prescribed succession.

4. An apparatus for testing a railroad signal system comprising a track circuit, a test circuit associated therewith, said test circuit including a multiple-unit transmitting device for inducing code signals of a different number of interruptions per minute in said track circuit, a switch, and means set in operation by a single movement of said switch for operating said code transmitting device and for automatically rendering the units thereof effective in alternate succession and for thereafter rendering said code transmitting device inoperative.

5. An apparatus for testing a railroad signal system comprising a track circuit, a test circuit associated therewith, said test circuit including code transmitting devices for inducing different code signals in said track circuit, a relay for setting said code transmitting devices in operation, and a number of additional relays, forming a part of the test circuit but otherwise independent of the system to be tested, for automatically rendering said code transmitting devices effective in alternate succession and for thereafter stopping the operation of the code transmitting devices, all of said acts following automatically from a single actuation of the first mentioned relay.

6. An apparatus for testing a railroad signal system comprising a track circuit, a test circuit associated therewith, said test circuit including code transmitting devices for inducing different code signals in said track circuit, a relay for setting said code transmitting devices into operation, a circuit including a plurality of thermal relays and contacts associated therewith, said relays and contacts forming a part of said test circuit but otherwise independent of the system to be tested, for automatically rendering said code transmitting devices effective in alternate succession and for thereafter stopping the operation of the code transmitting devices and returning all of the contacts to their normal position.

In testimony whereof, I have hereunto signed my name at Philadelphia, Pennsylvania, this 19th day of May, 1930.

JOHN A. C. KING.